United States Patent
Hsieh

(10) Patent No.: US 8,657,491 B2
(45) Date of Patent: Feb. 25, 2014

(54) DETACHABLE PROBE COVER FOR EAR THERMOMETER AND MANUFACTURING METHOD THEREOF

(75) Inventor: Chih-Wei Hsieh, Hsinchu (TW)

(73) Assignee: Actherm Inc., Hsinchu (TW)

( * ) Notice: Subject to any disclaimer, the term of this patent is extended or adjusted under 35 U.S.C. 154(b) by 323 days.

(21) Appl. No.: 13/307,885

(22) Filed: Nov. 30, 2011

(65) Prior Publication Data

US 2012/0076169 A1 Mar. 29, 2012

Related U.S. Application Data

(63) Continuation-in-part of application No. 12/116,304, filed on May 7, 2008, now Pat. No. 8,092,082.

(30) Foreign Application Priority Data

Nov. 9, 2007 (TW) .............................. 96142339 A

(51) Int. Cl.
*A61B 1/227* (2006.01)
*G01K 1/08* (2006.01)

(52) U.S. Cl.
USPC ........... 374/158; 374/209; 374/208; 374/121; 374/163; 600/184

(58) Field of Classification Search
USPC ......... 374/158, 209, 120, 121, 163, 179, 208; 600/184, 474, 549
See application file for complete search history.

(56) References Cited

U.S. PATENT DOCUMENTS

| 5,088,834 | A | 2/1992 | Howe et al. |
| 6,224,256 | B1 | 5/2001 | Bala |
| 6,647,284 | B1 | 11/2003 | Lee |
| 8,136,986 | B2 * | 3/2012 | Lane et al. ..................... 374/158 |
| 2005/0027168 | A1 | 2/2005 | Strom et al. |
| 2005/0027169 | A1 | 2/2005 | Goldfain et al. |

FOREIGN PATENT DOCUMENTS

| CN | 1389712 A | 1/2003 |
| CN | 1720430 A | 1/2006 |
| CN | 1984599 A | 6/2007 |
| DE | 10336436 A1 | 3/2005 |
| EP | 1262753 A1 | 12/2002 |
| JP | 2001078967 A | 3/2001 |
| JP | 2003190106 A | 7/2003 |
| JP | 2007500541 A | 1/2007 |
| WO | WO-9500067 | 1/1995 |
| WO | WO-2004063687 | 7/2004 |

* cited by examiner

*Primary Examiner* — Gail Verbitsky
(74) *Attorney, Agent, or Firm* — Ming Chow; Sinorica, LLC

(57) ABSTRACT

This present invention discloses a detachable probe cover for an ear thermometer and a manufacturing method thereof. The detachable probe cover for the ear thermometer is for being mounted onto a measuring probe of the ear thermometer, wherein a combining mechanism is provided at a bottom of the measuring probe and the detachable probe cover comprises a main body of a hollow structure and a base, in which the main body has an open end and a closed end opposite to the open end, and the hollow structure has a diameter gradually reducing from the open end toward the closed end.

9 Claims, 7 Drawing Sheets

DETACHABLE PROBE COVER FOR EAR THERMOMETER AND MANUFACTURING METHOD THEREOF

CROSS-REFERENCE TO RELATED APPLICATIONS

This application is a continuation-in-part application of, and claims the benefit of priority from, the U.S. patent application Ser. No. 12/116,304 filed on May 7, 2008, now U.S. Pat. No. 8,092,082 the contents of which are incorporated by reference.

BACKGROUND OF THE INVENTION

1. Technical Field

The present invention relates to a probe cover for an ear thermometer and, more particularly, to a detachable probe cover for an ear thermometer.

2. Description of Related Art

In the known technical field, a cover for sheathing a temperature probe of an ear thermometer may be referred to the disclosure of some patents such as U.S. Pat. Nos. 5,088,834 and 6,022,140. The prior disclosure relates to a unitary probe cover that is equipped with a rim at a proximal portion thereof to couple a retention ears on the ear thermometer probe so as to fix the probe cover onto the ear thermometer probe. Further, a side wall of the probe cover is preferentially deformed in reaction to the ear thermometer probe straightening a surface of the cover. However, since the side wall is made of a material having limited elasticity, it can also provide limited effect on relaxing manufacturing tolerances. That is, the surface at a distal end portion of the cover can not be efficiently expanded, resulting in inaccurate measuring results of the ear thermometer. Furthermore, patents U.S. Pat. Nos. 5,163,418, 5,906,437, 6,371,639 and 6,647,284 all provide probe covers made of thin film. Such probe covers have some disadvantages, such as complex assembling process, inartistic appearance, wrinkled surfaces, and causing uncomfortableness to ears. To remedy the aforementioned defects of the conventional probe covers for ear thermometers, it is desired to improve the prior arts with a detachable probe cover, which can be finely adjusted when being mounted onto a probe of an ear thermometer and then has a portion corresponding to a measuring end of the probe smoothened so as to allow infrared rays stably pierce therethrough in order to ensure stableness and accuracy of measuring results of the ear thermometer.

SUMMARY OF THE INVENTION

In the attempt to remedy the imperfectness of the prior arts, the present invention provides a detachable probe cover for an ear thermometer that is primarily constructed from a main body of a hollow structure and a base, wherein the main body has an open end and a closed end opposite to the open end, and the hollow structure has a diameter gradually reducing from the open end toward the closed end.

Thus, it is one objective of the present invention to provide a detachable probe cover for an ear thermometer, in which the detachable probe cover can be automatically aligned so as to be easily mounted on and not easily take off a measuring probe of the ear thermometer.

It is another objective of the present invention to provide a detachable probe cover for an ear thermometer, in which when the detachable probe cover is mounted onto a measuring probe of the ear thermometer, the detachable probe cover is smoothened so as to facilitate more stable and more accurate measuring results of the ear thermometer.

It is another objective of the present invention to provide a manufacturing method for a detachable probe cover of an ear thermometer, in which the detachable probe cover can be automatically aligned so as to be easily mounted on and not easily take off a measuring probe of the ear thermometer.

It is another objective of the present invention to provide a manufacturing method for a detachable probe cover of an ear thermometer, in which when the detachable probe cover is mounted onto a measuring probe of the ear thermometer, the detachable probe cover is smoothened so as to facilitate more stable and more accurate measuring results of the ear thermometer.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

While the present invention discloses a detachable probe cover for an ear thermometer, it is to be stated first of all that the detailed manufacturing or processing procedures of the ear thermometer have been familiar to people skilled in the art and need not be discussed at length herein. Meantime, while the accompanying drawings are provided for the purpose of illustration, it is to be understood that the drawings are directed to the characteristics of the present invention and need not to be made in scale.

Figure 1A:
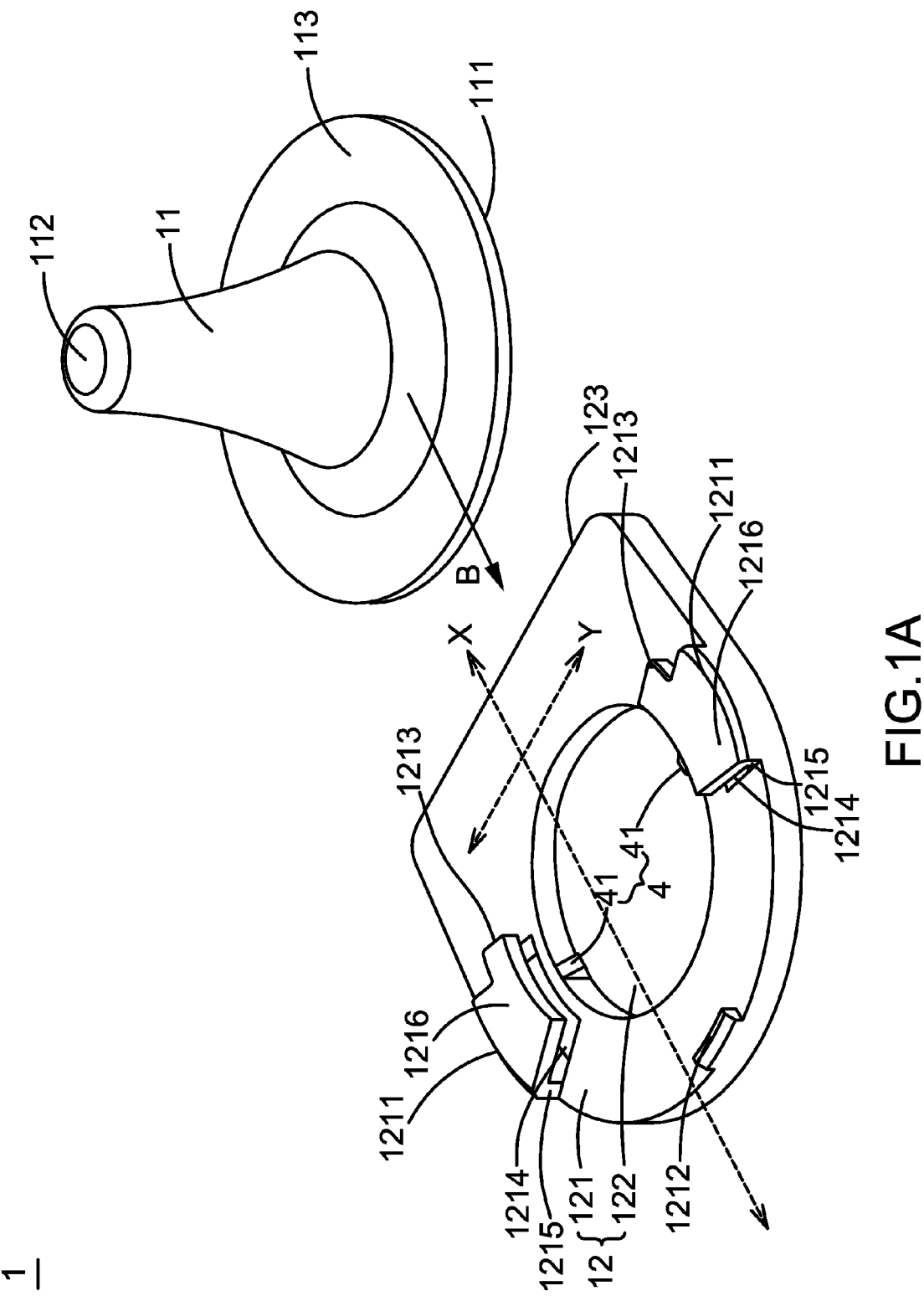
FIG. 1A is a perspective view of a first embodiment of the present invention, showing a detachable probe cover for an ear thermometer having protrusions.
Figure 1B:
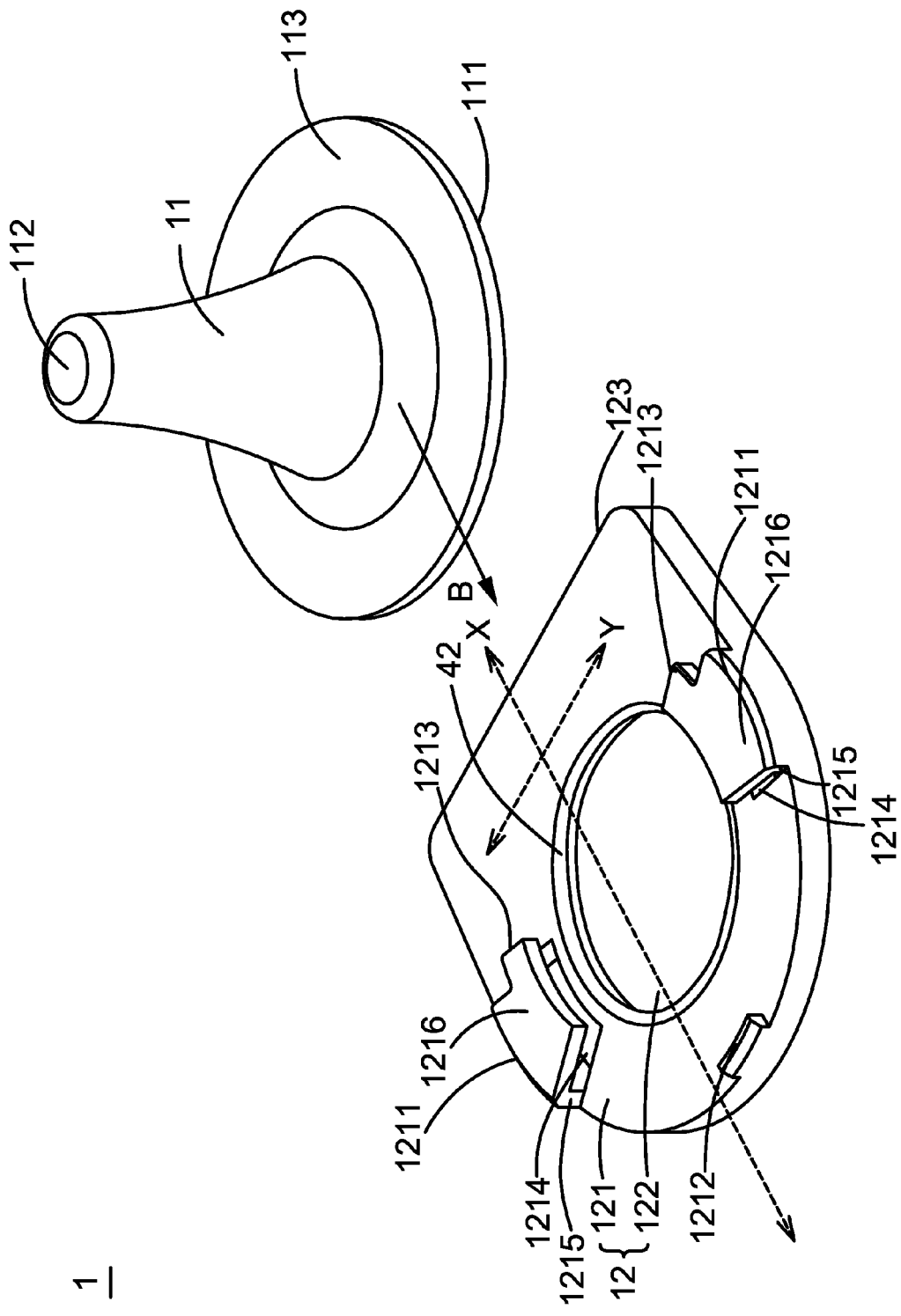
FIG. 1B is a perspective view of a second embodiment of the present invention, showing a detachable probe cover for an ear thermometer having a protrudent ring.
Figure 2A:
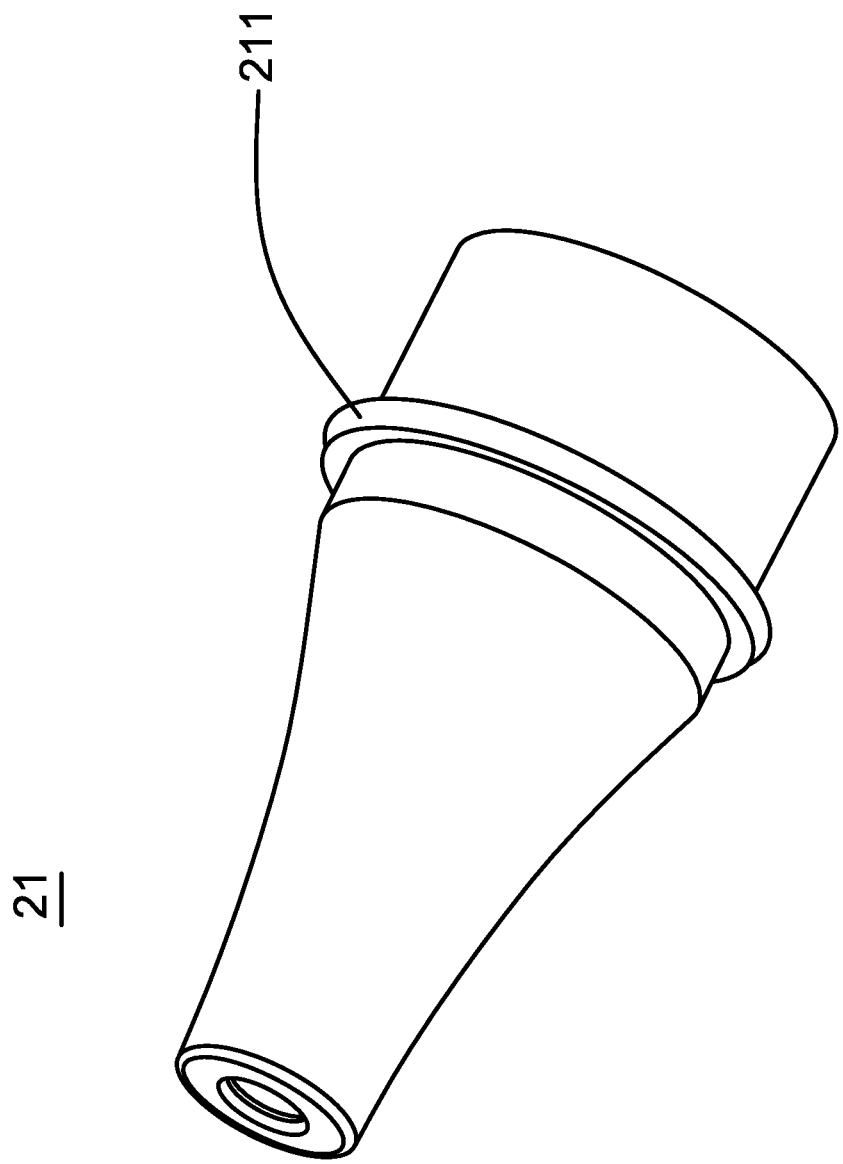
FIG. 2A is a perspective view of a measuring probe of the ear thermometer equipped with a combining mechanism of an annular structure according to the first or second embodiment of the present invention.
Figure 2B:
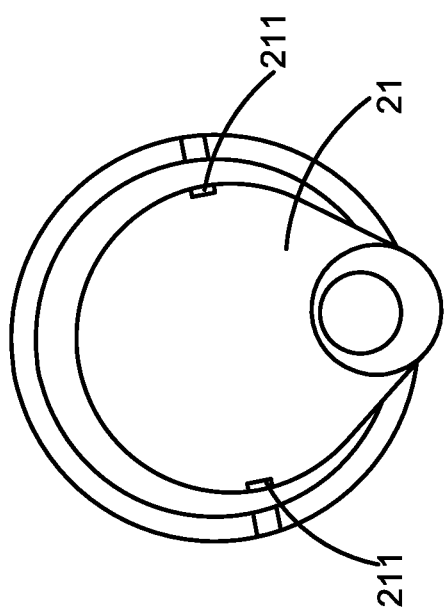
FIG. 2B is a perspective view of a measuring probe of the ear thermometer equipped with a combining mechanism formed as protrudent members according to the second embodiment of the present invention.

Please refer to FIG. 1A for a first embodiment of the present invention for a detachable probe cover 1, provided for an ear thermometer, is provided. The detachable probe cover 1 comprises a main body 11, a base 12, an open end 111, a closed end 112, a flange 113, a base plate 121, an opening 122, and protrusions 41. Therein, the detachable probe cover 1 is for being mounted onto a measuring probe 21 of the ear thermometer. Please proceed to FIG. 2A, wherein a combining mechanism 211 is provided at a bottom of the measuring probe 21 of the ear thermometer that may be formed as an annular structure so that when the detachable probe cover 1 is mounted onto the measuring probe 21 of the ear thermometer, the combining mechanism 211 at the bottom of the measuring probe 21 can be inlaid between the opening 122 formed at the center of the base plate 121 and the protrusions 41 of the base 12 of the detachable probe cover 1 so as to achieve combination between the detachable probe cover 1 and the measuring probe 21.

The main body 11 is of a hollow structure and is integrally made of plastic. The main body 11 has the open end 111 and the closed end 112 opposite to the open end 111 while the hollow structure has a diameter gradually reducing from the open end 111 toward the closed end 112 so that the hollow structure is shaped as a short truncated cone. The main body 11 may be made of polyethylene (PE), polypropylene (PP), polycarbonate (PC), polystyene (PS), poly ethylene terephthalate (PET) or poly vinyl chloride (PVC) where infrared rays can be transmitted through. The closed end 112 is a film wherethrough the measuring probe 21 of the ear thermometer receives a radiation wave (i.e. an infrared region) emitted by a human body. The main body 11 has a thickness of plastic decreasing from the open end 111 toward the closed end 112 so that the closed end 112 is the thinnest portion of the detachable probe cover 1.

At least one of said flange 113 is radially extended outward from the open end 111. The flange 113 may be a seamless integral or a sectioned flange with seams or intervals thereon, wherein the flange 113 formed as the seamless integral is most preferred. The base 12 comprises a base plate 121, an opening 122 formed at a center of the base plate 121, a longitudinal axis X and a transverse axis Y, wherein the longitudinal axis X is perpendicular to the transverse axis Y. When the main body 11 is parallelly inlaid into the base 12 along an inserting direction B, the opening 122 formed at the center of the base plate 121 is positionally corresponding to the open end 111 of the main body 11. Besides, the base 12 is further provided with a pair of retaining recesses 1211 and an entrance 1213 is formed at one end of each said retaining recess 1211. Each of the retaining recesses includes a sidewall 1215 extending upwardly from the base plate 121 and a covering plate 1216 extending from a lateral side of the base plate 121 toward the opening 122. Therein, the two retaining recesses 1211 are symmetrically settled so that the flange 113 is allowed to parallelly enter and be parallelly inlaid in the base 12 through the entrances 1213 along an inserting direction B, in which the inserting direction B is parallel to the longitudinal axis X of the base 12.

Figure 4:
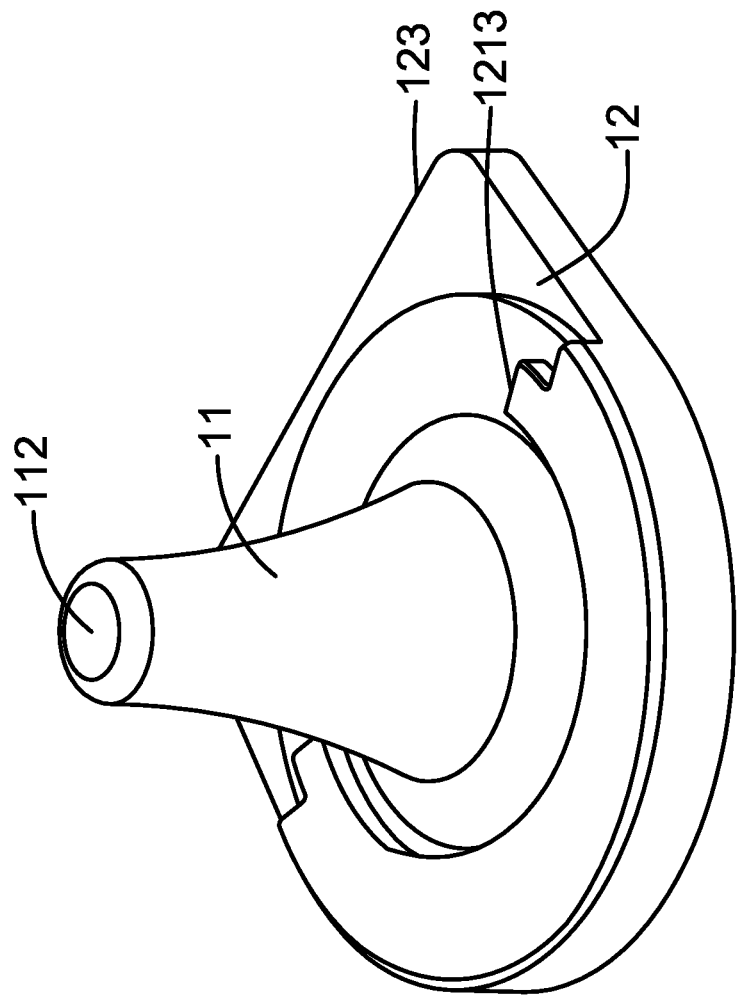
FIG. 4 is an assembled view of the detachable probe cover according the first or second embodiment of the present invention.

Furthermore, a distance between the entrances 1213 is smaller than a maximum diameter of the flange 113 of the main body 11, so that the flange 113 of the main body 11 can be secured after parallelly entering the entrances 1213 along the inserting direction B. In addition, a distance between two rear ends 1214 of the retaining recesses 1211 is smaller than the distance between the entrances 1213, so as to retain the flange 113 of the inlaid main body 11 from excessively moving. The rear ends 1214 of the retaining recesses 1211 may be such extended that the two retaining recesses 1211 are connected mutually (as shown in FIG. 4), so that when the flange 113 of the main body 11 is parallelly inlaid in the base 12 along the inserting direction B, the main body 11 is allowed to slightly shift with respect to the opening 122. Thereby, when the detachable probe cover 1 is to be mounted onto the measuring probe 21 of the ear thermometer, since the main body 11 is allowed to slightly shift, the detachable probe cover 1 can be smoothly mounted onto the measuring probe 21 of the ear thermometer.

The base plate 121 of the base 12 may be further provided with at least one block 1212 for additionally retaining the flange 113 of the main body 11 from excessively moving. On the other hand, the base 12 further comprises a guiding edge 123 for directionally guiding the detachable probe cover 1 when the detachable probe cover 1 is to be assembled or stacked.

The retaining recesses 1211 and the base plate 121 may be integrally formed or be assembled mutually, wherein it is most preferred that the retaining recesses 1211 and the base plate 121 are integrally formed. Furthermore, the retaining recesses 1211 and the base plate 121 of the base 12 may be assembled mutually with a method selected from the group consisting of an adhesive fixing process and a heat-melting fixing process.

Figure 3A:
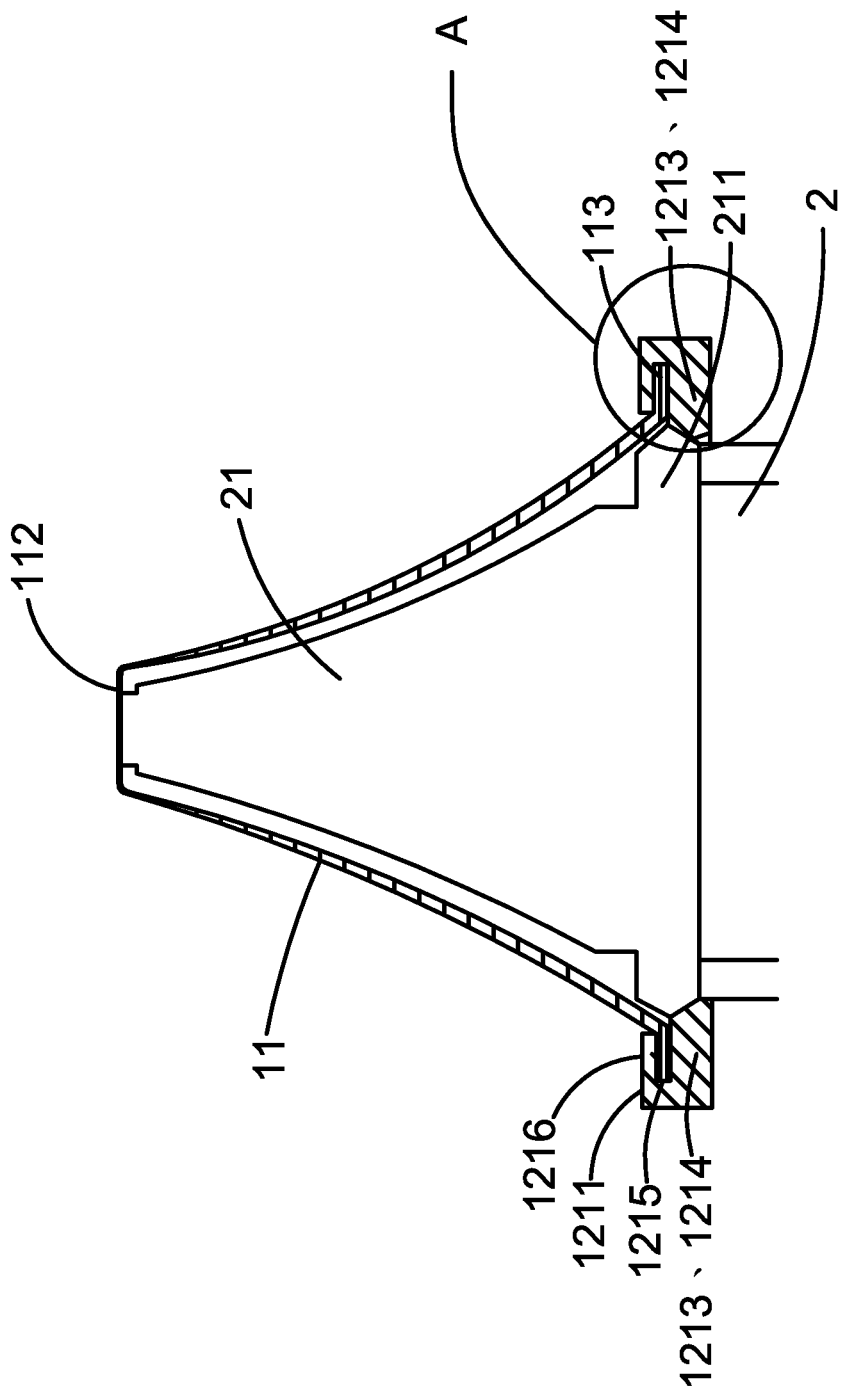
FIG. 3A is a sectional view of a detachable probe cover mounted on a measuring probe of an ear thermometer according the first or second embodiment of the present invention.
Figure 3B:
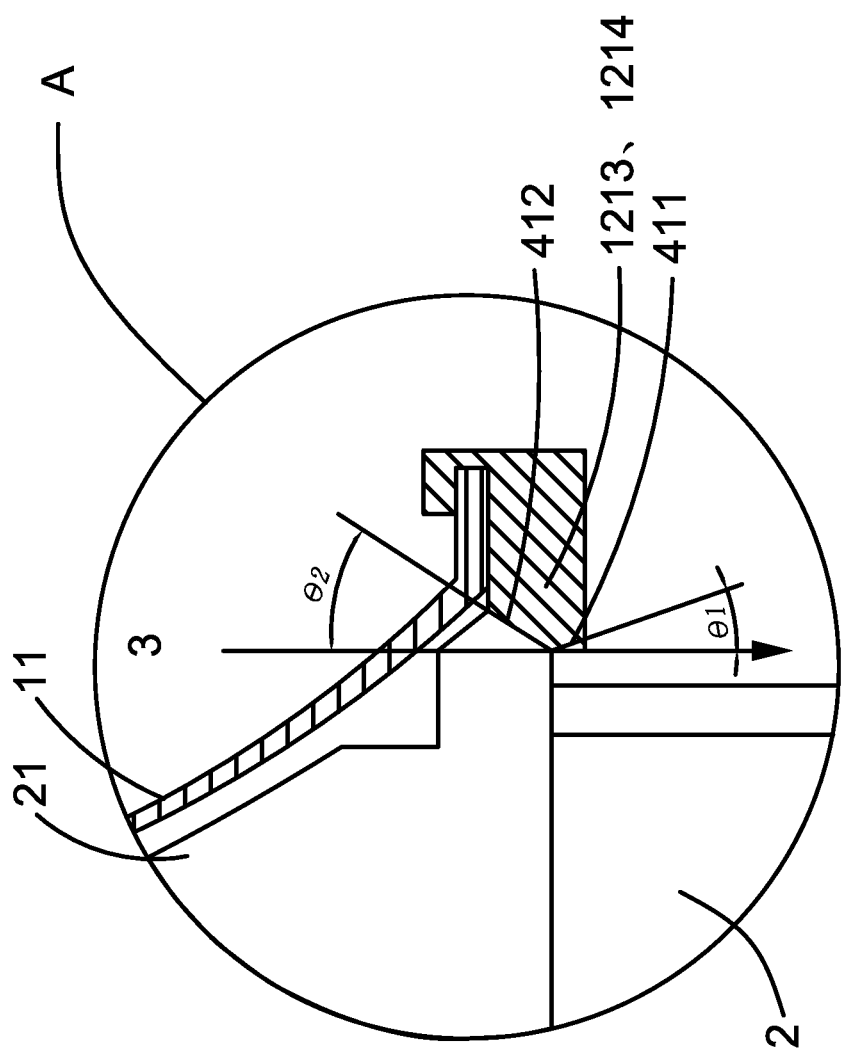
FIG. 3B is a partially enlarged view of Part A of FIG. 3A for illustrating the detachable probe cover mounted on the measuring probe of the ear thermometer according the first or second embodiment of the present invention.

A protrudent device 4 is provided on the base plate 121 of the base 12 and faces the opening 122. The protrudent device 4 is at lest two said protrusions 41 and a diameter of the opening 122 formed at the center of the base plate 121 is smaller than a diameter of the open end 111 of the main body 11 so that when the detachable probe cover 1 is mounted onto the measuring probe 21 of the ear thermometer, the combining mechanism 211 at the measuring probe 21 of the ear thermometer can be further inlaid between the opening 122 and the protrusions 41 of the base 12 so as to achieve combination between the detachable probe cover 1 and the measuring probe 21. The protrusions 41 may be positioned symmetrically on the base 12 or may be deposited on the base 12 with unequal distances therebetween, wherein it is most preferred that the protrusions 41 are positioned symmetrically on the base 12. Now referring to FIGS. 3A and 3B, a guiding surface 411 is further provided on each said protrusion 41 and facing the base 12 while a retaining surface 412 is further provided on each said protrusion 41 and facing the main body 11 so that when the detachable probe cover 1 is mounted onto the measuring probe 21 of the ear thermometer along an assembling direction 3, a first included angle $\theta 1$ included between the guiding surface 411 and the assembling direction 3 is smaller than a second angle $\theta 2$ included between the retaining surface 412 and the assembling direction 3. Thereupon, the detachable probe cover 1 can be mounted onto the measuring probe 21 of the ear thermometer with enhanced smoothness and firmness, so as to achieve combination between the detachable probe cover 1 and the measuring probe 21. As in the detachable probe cover 1, a distance between the retaining surface 412 and the closed end 112 is smaller than that between the combining mechanism 211 and an end of the measuring probe 21, after the detachable probe cover 1 is mounted onto the measuring probe 21 and when the combining mechanism 211 at the bottom of the measuring probe 21 of the ear thermometer abuts on the retaining surface 412, the main body 11 can be expanded and deformed because the distance between the combining mechanism 211 and an end of the measuring probe 21 is greater than that between the retaining surface 412 and the closed end 112. Consequently, the closed end 112 can present a smooth surface that allows infrared rays stably pierce therethrough in order to ensure that the ear thermometer obtains measuring results with less inaccuracy.

The present invention further provides a second embodiment. Please refer to FIG. 1B through FIG. 4 for a detachable probe cover 1, provided for an ear thermometer, is provided. The detachable probe cover 1 comprises a main body 11, a base 12, an open end 111, a closed end 112, a flange 113, a base plate 121, an opening 122, and a protrudent ring 42. In such case, a combining mechanism 211 may be formed as protrudent members or an annular shape, whereby a measuring probe 21 of an ear thermometer can be inlaid between the opening 122 formed at the center of the base plate 121 and the protrudent ring 42 of the base 12 of the detachable probe cover 1 so as to achieve combination between the detachable probe cover 1 and the measuring probe 21. Other characteristics of the detachable probe cover 1 may be as those disclosed in the first embodiment.

The present invention further provides a third embodiment related to a manufacturing method for the detachable probe cover 1 according to the first embodiment. The disclosed method comprises: (1) providing a main body 11, which is integrally made of plastic and has at least one flange 113 extended radially from an open end 111 of the main body 11; and (2) providing a base 12, which comprises a base plate 121, an opening 122 formed at the center of the base plate 121, a longitudinal axis X and a transverse axis Y, wherein the longitudinal axis X is perpendicular to the transverse axis Y. The opening 122 is positionally corresponding to the open end 111 of the main body 11 and the base 12 is formed with at least one entrance 1213 for allowing the flange 113 of the main body 11 to be parallelly inlaid in the base 12 along an inserting direction B, in which the inserting direction B is parallel to the longitudinal axis X of the base 12. Therein, the combining mechanism 211 provided at a bottom of a measuring probe 21 of the ear thermometer is of an annular structure (referring to FIG. 2A) whereby the combining mechanism 211 can retain the measuring probe 21 of the ear thermometer between the opening 122 formed at the center of the base plate 121 and protrusions 41 of the base 12 of the detachable probe cover 1 so as to achieve combination between the detachable probe cover 1 and the measuring probe 21 of the ear thermometer. Other characteristics of the detachable probe cover 1 may be as those disclosed in the first embodiment.

The present invention further provides a fourth embodiment related to a manufacturing method for the detachable probe cover 1 according to the second embodiment. The disclosed method comprises: (1) providing a main body 11, which is integrally made of plastic and has at least one flange 113 extended radially from an open end 111 of the main body 11; and (2) providing a base 12, which comprises a base plate 121, an opening 122 formed at the center of the base plate 121, a longitudinal axis X and a transverse axis Y, wherein the longitudinal axis X is perpendicular to the transverse axis Y. The opening 122 is positionally corresponding to the open end 111 of the main body 11 and the base 12 is formed with at least one entrance 1213 for allowing the flange 113 of the main body 11 to be parallelly inlaid in the base 12 along an inserting direction B, in which the inserting direction B is parallel to the longitudinal axis X of the base 12. Therein, a combining mechanism 211 provided at a bottom of a measuring probe of the ear thermometer is formed as protrudent members (referring to FIG. 2B) or of an annular structure (referring to FIG. 2A) whereby the measuring probe 21 of the ear thermometer can be inlaid between the opening 122 formed at the center of the base plate 121 and a protrudent ring 42 of the base 12 of the detachable probe cover 1 so as to achieve combination between the detachable probe cover 1 and the measuring probe 21 of the ear thermometer. Other characteristics of the detachable probe cover 1 may be as those disclosed in the first embodiment.

Although the particular embodiments of the invention have been described in detail for purposes of illustration, it will be understood by one of ordinary skill in the art that numerous variations will be possible to the disclosed embodiments without going outside the scope of the invention as disclosed in the claims.

What is claimed is:

1. A detachable probe cover for an ear thermometer, which is to be mounted onto a measuring probe of the ear thermometer, wherein a combining mechanism is provided at a bottom of the measuring probe and the detachable probe cover comprises a main body of a hollow structure and a base, in which the main body has an open end and a closed end opposite to the open end, and the hollow structure has a diameter gradually reducing from the open end toward the closed end, which is characterized in:

the main body being integrally made of a plastic material and having at least one flange radially extended outward from the open end;

the base comprising a base plate, an opening formed at a center of the base plate, a longitudinal axis and a transverse axis, wherein the longitudinal axis is perpendicular to the transverse axis and the opening is corresponding to the open end of the main body;

a pair of retaining recesses being provided on the base plate and an entrance being provided at an end of each of the retaining recesses, wherein:

each of the retaining recesses includes a sidewall extending upwardly from the base plate and a covering plate extending from a lateral side of the base plate toward the opening; and the two retaining recesses are symmetrically settled so that the flange of the main body parallelly enters and be parallelly inlaid in the base through the entrance along an inserting direction, in which the inserting direction is parallel to the longitudinal axis of the base;

a distance between the entrances of the retaining recesses is smaller than a maximum diameter of the flange of the main body.

2. The detachable probe cover of claim 1, wherein after the flange of the main body is inlaid in the base, the main body is allowed to slightly shift with respect to the opening so that when the detachable probe cover is to be mounted onto the measuring probe of the ear thermometer, and since the main body is allowed to slightly shift, the detachable probe cover is smoothly mounted onto the measuring probe of the ear thermometer.

3. The detachable probe cover of claim 1, wherein the hollow structure of the main body is shaped as a short truncated cone and the main body has a thickness decreasing gradually from the open end toward the closed end.

4. The detachable probe cover of claim 1, wherein a distance between two rear ends of the two retaining recesses is smaller than the distance between the entrances, so as to retain the flange of the inlaid main body from excessively moving.

5. The detachable probe cover of claim 1, wherein two rear ends of the two retaining recesses are such extended that the two retaining recesses are connected mutually.

6. The detachable probe cover of claim 1, wherein the two retaining recesses and the base plate of the base are integrally formed.

7. The detachable probe cover of claim 1, wherein the two retaining recesses and the base plate of the base are assembled together.

8. The detachable probe cover of claim 7, wherein the two retaining recesses and the base plate of the base are assembled by a method selected from the group consisting of an adhesive fixing process and a heat-melting fixing process.

9. The detachable probe cover of claim 1, wherein the base plate of the base further has at least one block for retaining the flange of the main body from excessively moving.

* * * * *